United States Patent [19]
Duhaime et al.

[11] Patent Number: 5,425,470
[45] Date of Patent: Jun. 20, 1995

[54] FUEL TANK CLOSURE

[75] Inventors: Daniel M. Duhaime, Bloomfield Hills; Mark R. Henault, Ypsilanti, both of Mich.

[73] Assignee: Ford Motor Company, Dearborn, Mich.

[21] Appl. No.: 172,957

[22] Filed: Dec. 27, 1993

[51] Int. Cl.[6] .................. B65D 43/14; B65D 88/00; F17C 3/00
[52] U.S. Cl. .................... 220/415; 220/465; 215/232; 215/233; 215/355; 215/364; 215/54; 206/0.6; 206/524.2; 428/35.7; 428/36.7; 428/36.91; 428/476.1; 428/518
[58] Field of Search .................... 206/0.6, 524.1, 524.2, 206/524.5, 524.9; 215/33, 35, 355, 364, 232, 233; 220/359, 613, 626, 465, 415, 453; 428/35.4, 36.7, 36.91, 36.9, 518, 476.1, 35.7

[56] References Cited

U.S. PATENT DOCUMENTS

| | | | |
|---|---|---|---|
| 2,713,369 | 7/1955 | Strahm | 220/613 |
| 3,767,790 | 10/1973 | Guttag | 428/36.91 |
| 4,008,347 | 2/1977 | Amberg et al. | 428/36.5 |
| 4,048,361 | 9/1977 | Valyi | 428/36.7 |
| 4,116,359 | 9/1978 | Josephy | 220/359 |
| 5,029,699 | 7/1991 | Insley et al. | 206/524.5 |
| 5,079,056 | 1/1992 | Watkins | 428/36.9 |
| 5,129,544 | 7/1992 | Jacobson et al. | 220/453 |
| 5,219,665 | 6/1993 | Chen et al. | 220/415 |

Primary Examiner—Ellis P. Robinson
Assistant Examiner—Rena L. Dye
Attorney, Agent, or Firm—Damian Porcari; Roger L. May

[57] ABSTRACT

A permeation resistant closure for a mutlilayer fuel tank. A barrier layer within a closure plug aligns with the barrier layer of a fuel tank wall to form an integral and uninterrupted permeation resistant barrier surface.

5 Claims, 3 Drawing Sheets

FUEL TANK CLOSURE

FIELD OF THE INVENTION

The present invention relates to a closure means for automotive fuel tanks. More specifically, the invention relates to a closure for coextruded fuel tanks having an intermediate barrier layer.

BACKGROUND OF THE INVENTION

Modern automotive fuel tanks are subject to a permeation requirement that limits the amount of hydrocarbons which can be emitted through a fuel tank wall. To achieve permeation resistance, it has become common to form a plastic fuel tank with two or more layers. One layer serves as a permeation barrier. The most common method of forming these mutlilayer structures is to form a three layer extrusion. The extrusion has an inner and outer layer usually made from a high density polyethylene (HDPE) and a barrier layer made from ethylene-vinyl-alcohol (EVOH) therebetween. The barrier layer serves to prevent or retard the permeation of hydrocarbons through the fuel tank wall.

Various openings are formed in the fuel tank for receiving items such as the fuel delivery module, filler pipe and sensing tube. It is desirable to place these openings in an area that is punctured by a blow pin during the manufacturing process. It is not always possible to align the desired openings with the puncture. These punctures are generally closed by means of a plug. The puncture is machined into a smooth surface that receives a closure plug. Closure plugs are generally welded to the exterior surface of the fuel tank wall. Existing closure plugs provide a permeation path for hydrocarbons. Solid closure plugs made from high density polyethylene permit the passage of hydrocarbons. Additionally, the edge of the fuel tank wall may become exposed to fuel. The edge contains the interface between the barrier and the inner and outer layers. Exposure to fuel may degrade the cohesiveness of the multilayer wall.

The present invention overcomes the deficiencies of the prior art by providing a closure plug having a barrier layer. The barrier layer resists the permeation of fuel through the closure. The barrier layer of the closure plug aligns with and welds to the barrier layer of the wall. In this fashion, the invention provides a nearly uninterrupted and integral permeation resistant surface in the vicinity of the closure.

SUMMARY OF THE INVENTION

The present invention teaches a closure plug for a multilayer plastic fuel tank. The fuel tank includes a three layer wall having inner and outer layers and a barrier layer therebetween. The wall includes an opening that receives a closure plug. The closure plug has inner and outer layers and a barrier layer therebetween. The barrier layer of the closure plug is linerally aligned with and juxtaposed the barrier layer of the wall. The wall barrier and the closure plug barrier layer form an uninterrupted and integral surface resisting permeation in the vicinity of the closure.

The invention also seals the interfacial fuel tank wall surface. Both the inner and outer layers of the fuel tank wall are welded to the inner and outer layers of the barrier plug. This facilitates closure of a fuel tank having inner and outer walls made of different material.

DETAIL DESCRIPTION OF THE PREFERRED EMBODIMENT

Figure 1:
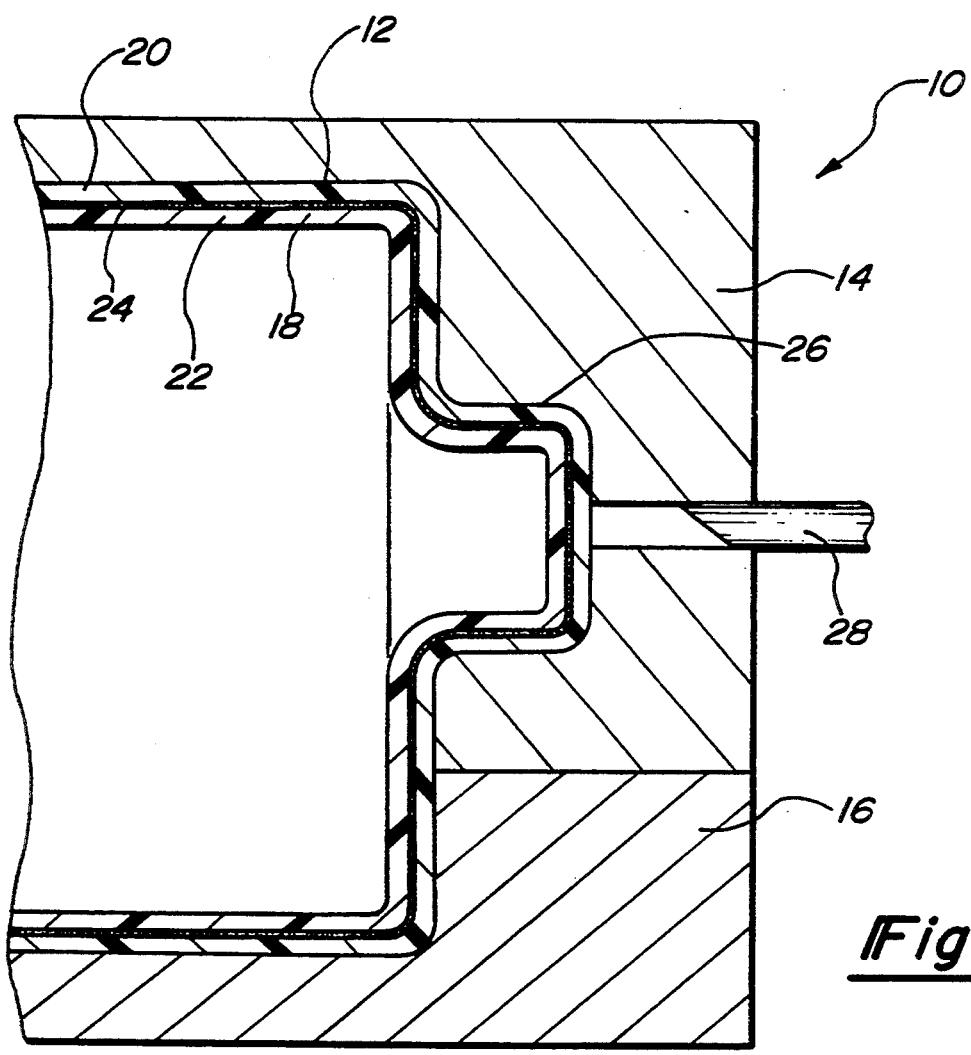
FIG. 1 illustrates a partial cross-sectional view of a blow molding apparatus molding a coextruded fuel tank.

Illustrated in FIG. 1 is a blow molding apparatus 10 used to mold an automotive fuel tank 12. Apparatus 10 comprises matched opposable dyes 14, 16. A length of pliable tubular parison is extruded between dyes 14, 16. The parison forms a three layer wall 18 including outer layer 20, inner layer 22 and barrier layer 24. Layers 20, 22 are generally made from high density polyethlene (HDPE) but other polymeric materials are also suitable for the present invention. It may be desirable to manufacture outer layer 20 from one grade of HDPE and inner layer 22 from another grade. Barrier layer 24 is extruded intermediate inner and outer layers 20, 22. Barrier layer 24 serves to unite inner and outer layers 20, 22 and to prevent the permeation of hydrocarbons through wall 18. Suitable material for barrier layer 24 include ethylene vinyl alcohol (EVOH), nylon and acetel. Barrier layer 24 may be optionally coated with a tie layer to promote adhesion to the fuel tank inner and outer layers. If fuel tank 12 or closure plug 42 is manufactured using regrind HDPE, it is preferable that the regrind be placed between inner layer 22 and barrier layer 24. Outer layer 20 and the fuel contacting surface of inner layer 22 should be made from virgin HDPE.

Wall 18 is formed into a protrusion 26. Protrusion 26 has a generally U-shaped cross section. Blow pin 28 is inserted through protrusion 26. Blow pin 28 serves to inflate the parison during the molding operation. After wall 18 has cooled, blow pin 28 is withdrawn and fuel tank 12 is removed from apparatus 10.

Figure 2:
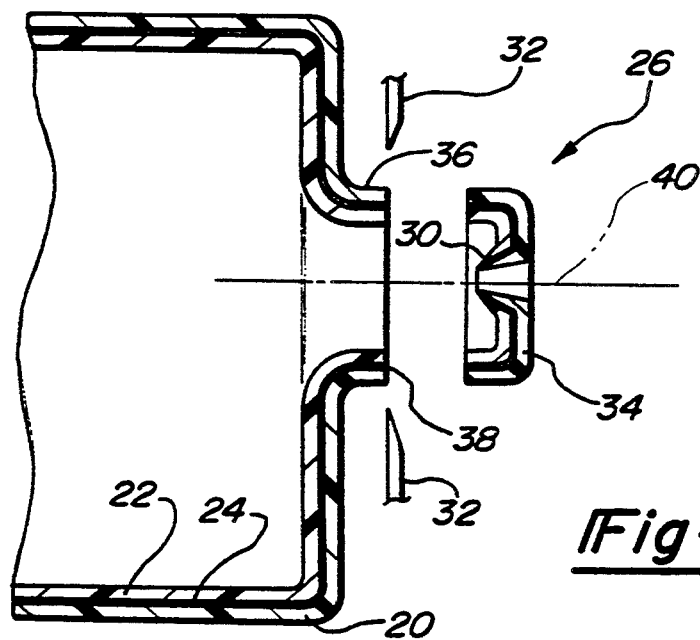
FIG. 2 is a partial cross-sectional view of the fuel tank removed from the molding apparatus and severing the blow pin puncture.

As shown in FIG. 2, the blow pin forms an irregularly shaped punctured opening 30 within protrusion 26. Protrusion 26 is severed by knives 32. End 34 is removed and discarded. An outwardly extending nipple 36 receives a closure plug. Nipple 36 has a first surface 38 generally perpendicular to opening 40. Surface 38 includes the interfacial boundaries between inner and outer layers 20, 22 and barrier layer 24.

Figure 3:
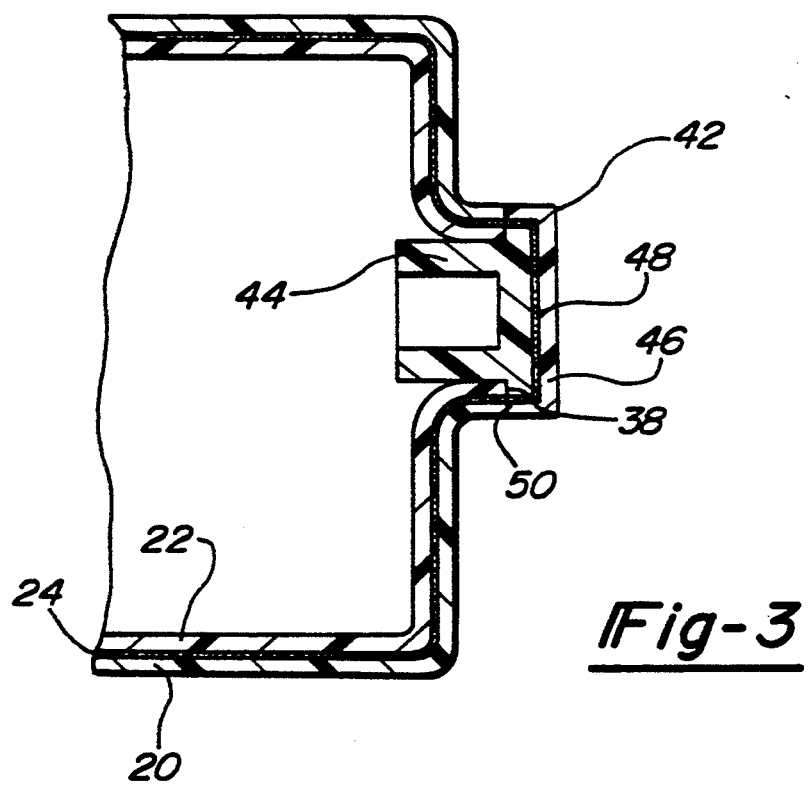
FIG. 3 is a partial cross-sectional view of the fuel tank closure assembly.

Illustrated in FIG. 3 is closure plug 42 within opening 40. Closure plug 42 includes inner layer 44, outer layer 46 and barrier layer 48 therebetween. Inner layer 44 is generally made from a similar or compatible material as inner layer 22. Outer layer 46 is made from a similar material as outer layer 20. Barrier layer 48 is made from a similar material as barrier layer 24. Closure plug 42 includes a second surface 50 mating with first surface 38. Surfaces 38, 50 are welded so that the similar materials of wall 12 and closure plug 42 weld and fuse to one another to form an integral and uninterrupted surface. Outer layer 20 welds to outer layer 46. Inner layer 22 welds to inner layer 44. Barrier layer 24 weld to barrier layer 48.

The method of construction illustrated in FIGS. 1-3 is especially useful when inner and outer layers 20, 22 are made from dissimilar or incompatible materials. The T-shaped closure plug illustrated in FIG. 3 provides a similar and compatible surface for each layer. Barrier layers 24, 48 combine to form an integral and uninterrupted permeation resistant surface.

Figure 4:
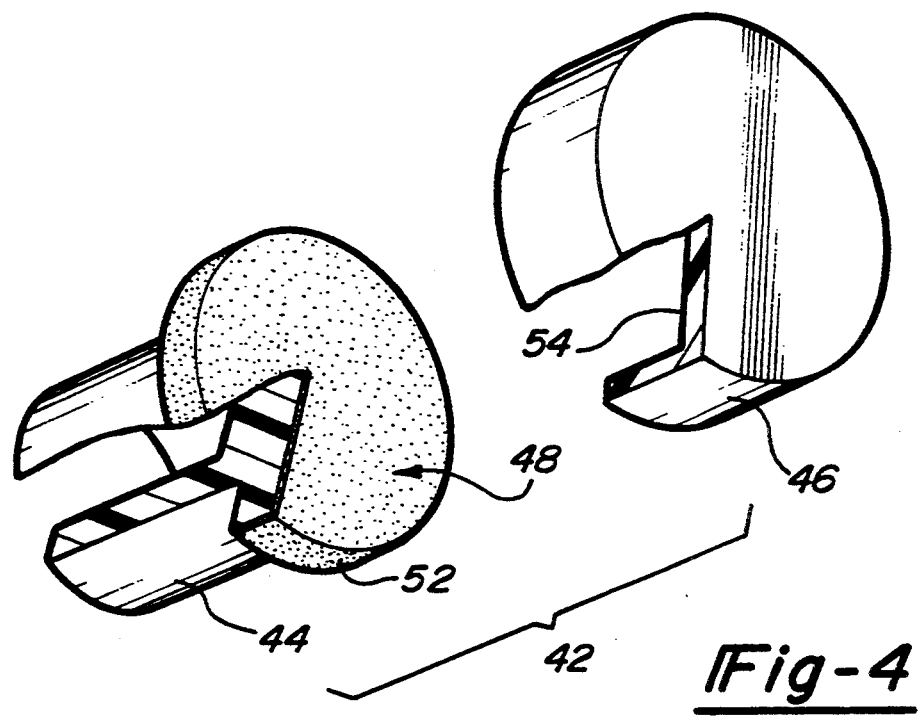
FIG. 4 is an exploded view partially broken away of the closure plug shown in FIG. 3.

Illustrated in FIG. 4 is an exploded detailed view of closure plug 42. Inner layer 44 has an enlarged head 52. Head 52 is coated with barrier layer 48. Head 52 is inserted into recess 54 of outer layer 46. Closure plug 42 may be manufactured by simultaneous injection molding or may be fabricated in separate components and assembled together through welding or bonding.

Closure plug 42 is welded onto nipple 36 by a variety of welding methods. Preferred is hot plate welding. Other suitable welding methods include solvent welding, vibration welding, ultrasonic welding, and infrared welding. Sufficient heat is applied to first and second surface 38, 50 to soften the material contained within these surfaces. Sufficient pressure is applied to closure plug 42 to urge the molten material together to fuse and form an integral bond. Excessive heat may damage the material or cause inner, outer and barrier layers of surfaces 38, 50 to intermingle. This would degrade the integral surface of the barrier layer and reduce the permeation resistance.

Figure 5:
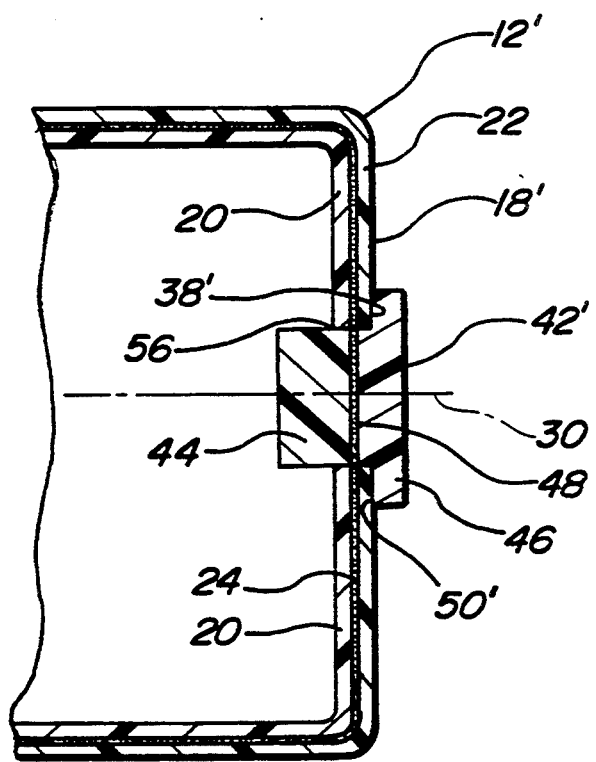
FIG. 5 is an alternative embodiment of the invention.

Illustrated in FIG. 5 is a partial cross-sectional view of an alternative embodiment of the present invention. Fuel tank 12' includes a generally planar wall 18'. The method of manufacture of fuel tank 12' is generally similar to that previously disclosed, however, no protrusion is formed within wall 18'. Opening 30 is formed within wall 18'. Plug 42' is inserted within opening 30. Second surface 50' mates with and seals to first surface 38'. First and second surfaces 38', 50' do not include the interfacial boundary of the different layers. The interfacial boundaries occur at interface 56. While possible, it is more difficult to weld together the inner, outer and barrier layers of wall 18' and closure plug 42'.

The invention has been illustrated as a method of manufacturing an automotive fuel tank. Other variations and adaptations of the preferred embodiment are possible without departing from the spirit or scope of the appended claims.

I claim:

1. A plastic fuel tank comprising:
   a multi-layer wall having polymeric inner and outer layers and a barrier layer therebetween which serves to prevent or retard the permeation of hydrocarbons through said wall;
   said wall defining an opening receiving a closure plug; and
   said closure plug having polymeric inner and outer layers and a barrier layer therebetween welded to said wall, said barrier layer of said closure plug is linearly aligned with and juxtaposed said barrier layer of said wall, whereby said wall barrier layer and said closure plug barrier layer form an uninterrupted integral surface in the vicinity of the closure.

2. The fuel tank of claim 1 wherein said wall forms an outwardly extending nipple having a first surface perpendicular with said opening.

3. The fuel tank of claim 2 wherein said closure plug has a second surface mating with said first surface, whereby said outer layer of said closure plug is juxtaposed said outer layer of said wall and said inner layer of said closure plug is juxtaposed said inner layer of said wall.

4. The fuel tank of claim 1 wherein said inner layer of said wall is welded to the inner layer of said closure plug and the outer layer of said wall is welded to the outer layer of said closure plug and the barrier layer of said wall is welded to the barrier layer of said closure plug.

5. A plastic fuel tank comprising:
   a multi-layer wall having HDPE inner and outer layers and an EVOH barrier layer therebetween which serves to prevent or retard the permeation of hydrocarbons through said wall;
   said wall forming an outwardly extending nipple having a first surface parallel with said wall and defining an opening receiving a closure plug; and
   said closure plug having HDPE inner and outer layers and an EVOH barrier layer therebetween, said barrier layer of said closure plug is linearly aligned with and welded to said barrier layer of said wall and said outer layer of said closure plug is juxtaposed and welded to said outer layer of said wall and said inner layer of said closure plug is juxtaposed and welded to said inner layer of said wall, whereby said wall barrier layer and said closure plug barrier layer form an uninterrupted integral surface in the vicinity of the closure plug.

* * * * *